United States Patent
Teia Dos Santos Mendes Gomes (10) Patent No.: US 9,982,627 B2
(45) Date of Patent: May 29, 2018

(54) THRUST REVERSER UNIT HAVING BOTH NESTED CASCADES TRANSLATING LINEARLY AND ONLY ONE CASCADE ROTATIONAL

(71) Applicant: ROLLS-ROYCE DEUTSCHLAND LTD & CO KG, Dahlewitz (DE)

(72) Inventor: Luis Daniel Teia Dos Santos Mendes Gomes, Berlin (DE)

(73) Assignee: ROLLS-ROYCE DEUTSCHLAND LTD & CO KG, Dahlewitz (DE)

( * ) Notice: Subject to any disclaimer, the term of this patent is extended or adjusted under 35 U.S.C. 154(b) by 816 days.

(21) Appl. No.: 14/445,360

(22) Filed: Jul. 29, 2014

(65) Prior Publication Data
US 2016/0025037 A1    Jan. 28, 2016

(30) Foreign Application Priority Data

Aug. 14, 2013  (GB) .................................. 1314527.1

(51) Int. Cl.
*F02K 1/76* (2006.01)
*F02K 1/72* (2006.01)
(Continued)

(52) U.S. Cl.
CPC ................ *F02K 1/70* (2013.01); *F01D 9/041* (2013.01); *F01D 17/105* (2013.01); *F01D 25/24* (2013.01);
(Continued)

(58) Field of Classification Search
CPC ... F02K 1/62; F02K 1/625; F02K 1/68; F02K 1/70; F02K 1/72; F02K 1/74; F02K 1/763;
(Continued)

(56) References Cited

U.S. PATENT DOCUMENTS 3,248,878 A * 5/1966 Clark .................. B64C 29/0025
239/265.25
3,511,055 A    5/1970 Timms
(Continued)

FOREIGN PATENT DOCUMENTS

| EP | 1 843 031 A1 | 10/2007 |
| EP | 1 852 595 A2 | 11/2007 |
| FR | 2 757 570 A1 | 6/1998 |

OTHER PUBLICATIONS

Dec. 22, 2014 European Search Report issued in Application No. 14 17 8856.
(Continued)

*Primary Examiner* — William H Rodriguez
*Assistant Examiner* — James McGlynn
(74) *Attorney, Agent, or Firm* — Oliff PLC (57) ABSTRACT

A thrust reverser unit (TRU) 100 for a gas turbine engine 10 is provided that has first and second cascade elements 110, 120. In a stowed configuration, both the first and second cascade elements, and the operating mechanism, are located inside the nacelle 40, meaning that the TRU has no detrimental impact on the flow through the bypass duct 22. In the deployed configuration, the first cascade element 110 extends across the bypass duct 22. The first cascade element 110 has flow passages 112 that allow the flow to pass through, redirecting the flow towards the second cascade element 120. The second cascade element 120 further turns the flow so as to provide decelerating reverse thrust.

17 Claims, 9 Drawing Sheets

(51) Int. Cl.
  *F02K 1/70* (2006.01)
  *F01D 9/04* (2006.01)
  *F01D 17/10* (2006.01)
  *F01D 25/24* (2006.01)

(52) U.S. Cl.
  CPC ............... *F02K 1/72* (2013.01); *F02K 1/763* (2013.01); *F05D 2220/32* (2013.01); *F05D 2220/36* (2013.01); *F05D 2240/12* (2013.01); *F05D 2240/129* (2013.01); *F05D 2240/40* (2013.01); *F05D 2250/62* (2013.01); *F05D 2260/50* (2013.01)

(58) Field of Classification Search
  CPC .... F02K 1/566; F02K 1/605; F05D 2240/129; F05D 2250/411
  See application file for complete search history.

(56) References Cited

U.S. PATENT DOCUMENTS

| | | | |
|---|---|---|---|
| 3,829,020 A * | 8/1974 | Stearns | F02K 1/09 181/216 |
| 3,981,451 A | 9/1976 | Prior et al. | |
| 4,564,160 A | 1/1986 | Vermilye | |
| 5,575,147 A * | 11/1996 | Nikkanen | F02K 1/625 239/265.29 |
| 5,706,649 A * | 1/1998 | Robinson | F02K 1/008 239/265.13 |
| 9,874,176 B2 * | 1/2018 | Nakhjavani | F02K 1/76 |
| 2003/0042358 A1 | 3/2003 | Sternberger | |
| 2010/0024387 A1 | 2/2010 | Marche | |
| 2011/0284660 A1 | 11/2011 | Vauchel et al. | |
| 2013/0205753 A1 * | 8/2013 | Todorovic | F02K 3/025 60/226.2 |

OTHER PUBLICATIONS

Search Report issued in British Patent Application No. 1314527.1 dated Feb. 24, 2014.

* cited by examiner

THRUST REVERSER UNIT HAVING BOTH NESTED CASCADES TRANSLATING LINEARLY AND ONLY ONE CASCADE ROTATIONAL

CROSS-REFERENCE TO RELATED APPLICATIONS

This application is based upon and claims the benefit of priority from British Patent Application Number 1314527.1 filed 14 Aug. 2013, the entire contents of which is incorporated by reference.

BACKGROUND OF THE INVENTION

1. Field of the Disclosure

The invention relates to a thrust reverser unit for a gas turbine engine. In particular, the invention relates to a compact thrust reverser unit for turbofan gas turbine engines.

2. Description of the Related Art

Many modern aircraft use thrust reverser units (TRUs) to assist with the deceleration of an aircraft after landing. Such units operate by reversing the direction of at least a part of the flow passing through the engine, thereby generating a decelerating thrust. TRUs may be used in addition to conventional brakes provided on aircraft wheels. Such conventional brakes may be very efficient, but in adverse conditions, such as a wet or icy runway, the coefficient of friction between the aircraft wheels and the ground may be reduced. In contrast, the effectiveness of the TRUs is unaffected by such adverse conditions.

Conventionally, TRUs are only in use, or deployed, to decelerate the aircraft upon landing. During the rest of the flight, for example during take-off, cruise and decent, the TRUs are stowed away, and represent extra weight. This extra weight leads to increased fuel consumption.

Furthermore, the TRUs also occupy significant space within the gas turbine engine. For example, TRUs conventionally occupy significant space in the nacelle of a turbofan gas turbine engine when they are stowed during flight. It is desirable to reduce the size of nacelles of turbofan gas turbine engines, for example in order to improve the overall efficiency of the engines. The size of current TRUs may not be compatible with the desired reduction in the size of nacelles.

Figure 2:
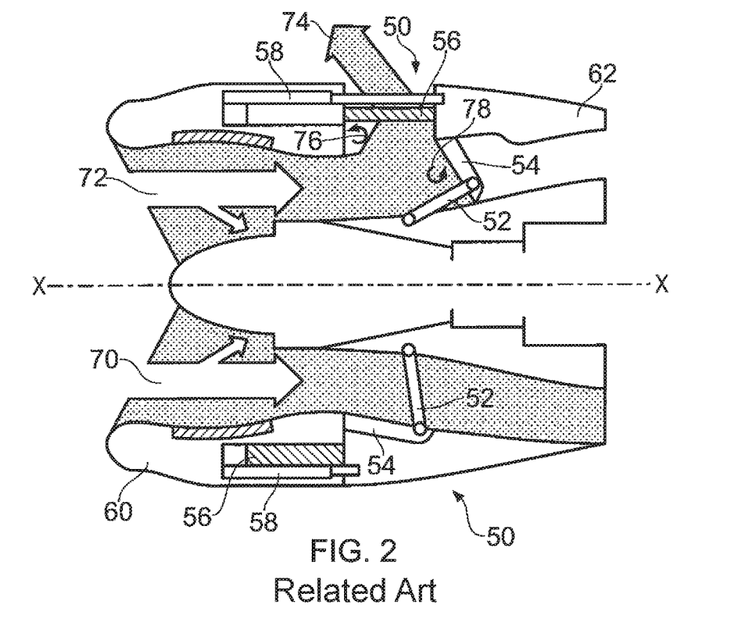
FIG. 2 shows a cross section through a gas turbine engine having a conventional thrust reverser unit in both a deployed configuration and a stowed configuration.

FIG. 2 shows an example of a conventional TRU 50 in both a deployed configuration (shown at the top of FIG. 2), and a stowed configuration (shown at the bottom of FIG. 2). It will be appreciated that, in use, all of the TRU 50 would be either in the deployed configuration or the stowed configuration, and that FIG. 2 shows both the stowed and deployed configurations merely for ease of explanation.

The conventional TRU 50 shown in FIG. 2 comprises a drag link 52, a blocker door 54, a cascade 56, and an actuator 58. In the stowed configuration shown at the bottom of FIG. 2, the blocker door 54, the cascade 56 and the actuator 58 are stowed within the nacelle 60; such that they do not influence the flow 70 through the bypass duct. However, the drag link 52 and its associated joints and hinges, of which there may be several circumferentially spaced around the bypass duct, extends across the bypass duct even when the TRU 50 is in the stowed configuration, thereby causing losses in the flow through the bypass duct.

In the deployed configuration shown at the top of FIG. 2, the actuator 58 has been extended so as to push the cascade 56 and the blocker door 54 rearwards. In doing so, the kinematics of the TRU 50 ensures that the blocker door 54 is rotated so as to extend across the bypass duct. The actuator 58 also moves a portion 62 of the nacelle 60 rearwards so as to expose the cascade 56. Thus, in the deployed configuration, the flow 72 in the bypass duct is prevented for passing along the full length of the duct by the blocker door 54. The cascade 56 then directs the blocked flow out of the engine, through the gap in the nacelle created by the rearward movement of the portion 62 of the nacelle 60, in a direction 74 that has a component in the forward direction, i.e. upstream relative to the flow 72 entering the bypass duct. In this way, the flow through the bypass duct is used to provide a decelerating thrust.

OBJECTS AND SUMMARY

The TRU arrangement shown in FIG. 2 has a number of disadvantages, which may be shared with other previously known TRU arrangements. For example, in the stowed configuration, the drag links 52 and the associated hinges, steps and gaps where they are joined to the other parts of the engine, create aerodynamic loss during normal, forward flight conditions, which leads to increased fuel consumption. In the deployed configuration, the large change in flow angle between the flow 72 in the bypass duct and the flow entering the cascade 56 means that the flow tends to separate from the nacelle surface at the forward part of the cascade 56, creating the recirculating region 76. Flow also tends to stagnate and recirculate in the region 78 in front of the blocker door, generating further losses. Additionally, the flow that has not separated has different angles along the length of the cascade 56, meaning either that the design of the elements in the cascade 56 has to be complex and thus expensive, or that the cascade 56 does not operate at optimum efficiency along its length. Any loss or inefficiency in the flow when the TRU 50 is in the deployed configuration means that the TRU 50 must be bigger and/or heavier to generate a given deceleration, leading to a further increase in fuel consumption.

It is therefore desirable to provide a TRU with improved efficiency in one or both of the stowed and deployed configurations, which can be made to be smaller and lighter. Any TRU must also be robust and reliable, both during deployment and retraction, as well as in use.

According to an aspect of the invention, there is provided a gas turbine engine having a bypass duct defined at its outer radius by a nacelle. The gas turbine engine is provided with a thrust reverser unit, the thrust reverser unit being operable in either a stowed configuration or a deployed configuration. The thrust reverser unit comprises
  a first element;
  a second element; and
  a joint that rotatably attaches the first element to the second element.

In the stowed configuration the first and second elements are contained within the nacelle. The joint may also be contained within the nacelle in the stowed configuration. The TRU, or at least the first and second elements of the TRU, may not be exposed to the bypass duct flow in the stowed configuration.

The first element is arranged to rotate about the joint relative to the second element between the stowed configuration and the deployed configuration. In the deployed configuration the first element extends across the bypass duct, meaning that the first element may extend entirely across the bypass duct (i.e. from its outer radius to its inner radius), or may extend partially across the bypass duct.

The first and second elements both have flow passages through which gas can pass. In the deployed configuration, in use at least some of the flow through the bypass duct is directed through both the first element and the second element.

As the flow passes through the TRU, and in particular through the first and second elements, the component of momentum of the flow in the axial direction of the engine (i.e. the longitudinal axis, or the thrust direction) may be reduced and/or reversed. This may be achieved by changing the direction of the flow as it passes from the bypass duct through the TRU. The first and second elements may contribute to the direction change. Accordingly, a decelerating force may be provided to the engine.

The first and/or second elements may be substantially flat or thin bodies. Such flat or thin bodies may have two major surfaces separated by a thickness, with the flow passages extending through the elements from openings in one major surface to openings in the other major surface.

Providing both the first and the second elements with flow passages therein may be a particularly efficient arrangement for using the momentum of the flow through the bypass duct to generate a decelerating force on the engine. For example, both the first and the second elements may contribute to turning the flow towards the upstream direction (relative to the flow through the bypass duct) in order to provide a decelerating force to the engine. This results in a compact and/or lightweight TRU.

According to an aspect, there is also provided a method of providing reverse thrust from a gas turbine engine, the gas turbine engine comprising a thrust reverser unit and a bypass duct defined at its outer radius by a nacelle, the method comprising:

moving the thrust reverser unit from a stowed configuration within the nacelle to a deployed configuration by rotating a first element of the thrust reverser unit, relative to a second element of the thrust reverser unit, from its stowed position within the nacelle to a deployed position in which it extends across the bypass duct, wherein the first and second elements both have flow passages through which gas can pass, such that in the deployed configuration, in use at least some of the flow through the bypass duct is directed through both the first element and the second element.

In the stowed configuration the first element and the second element may be substantially parallel. For example, they may be thin bodies in which their major surfaces are parallel. This may be a particularly compact configuration in which to stow the TRU when not in use.

In the deployed configuration the second element may form an angle in the range of from 10 degrees and 90 degrees with the first element, for example in the range of from 20 degrees and 80 degrees, for example in the range of from 30 degrees and 70 degrees, for example in the range of from 40 degrees and 60 degrees, for example in the range of from 45 degrees and 50 degrees. Thus, the first element may rotate relative to the second element by angles in the above ranges between the stowed configuration and the deployed configuration.

The gas turbine engine has a longitudinal axis (which may be referred to as the rotational axis of the engine, i.e. the axis about which fan, compressor and turbine blades rotate) and the angle of the second element relative to the longitudinal axis may be the same in both the stowed configuration and the deployed configuration. Thus, only the first element may rotate about the joint relative to the rest of the engine between the stowed and deployed configurations.

The joint that rotatably attaches the first element to the second element may be positioned at an upstream end of the first and second elements with respect to airflow through the bypass duct in use. In this way, the first element (for example a distal end of the first element) may rotate downwards (that is, radially inwards) and forwards into the bypass duct into its deployed position.

The flow passages in the first element may be defined by flow turning vanes. The flow turning vanes of the first element may be arranged (for example shaped and/or angled) so as to turn the flow towards the second element when in the deployed configuration, which may be away from the longitudinal axis of the engine and/or towards the radial direction. This may contribute to reducing the component of momentum of the bypass flow in the (downstream) axial direction of the engine, so as to provide a decelerating force to the engine.

The flow passages in the second element may be defined by flow turning vanes. The flow turning vanes of the second element may be arranged (for example shaped and/or angled) so as to turn the flow towards an upstream direction with respect to airflow through the bypass duct in use. In general, the flow at the exit of the second element may have a component in the upstream direction relative to the flow entering the bypass duct.

The flow turning vanes of the first and/or the second elements may take any suitable form. For example, they may simply be curved surfaces (which may form curved passages) that have a different inlet angle and outlet angle, thereby turning the flow as it passes through the flow passages. Alternatively, the flow turning vanes may be, for example, aerofoil shaped components which define the flow passages.

The flow passages in both the first element and the second element may be defined by flow turning vanes. The flow turning vanes of the first element and the second element turn the flow in the same sense about a circumferential direction of the engine.

The first and second elements may form a cascade of turning elements to turn the flow. As such, the first element may be referred to as a first (or lower, or inner) cascade element, and the second element may be referred to as a second (or upper or outer) cascade element.

In the stowed configuration, the flow turning vanes of the first element may be nested (or stacked) within the flow turning vanes of the second element. This may provide a particularly compact arrangement when in the stowed configuration.

The deployment of the TRU from the stowed configuration to the deployed configuration may be said to be a two-stage process, comprising translation (for example of both the first and second elements) followed by rotation (for example of the first element relative to the second element). Such an arrangement may allow for a particularly compact TRU.

The thrust reverser unit may further comprise an actuator arranged to translate the first and second elements and a first part of the nacelle relative to each other so as to expose the first and second elements to the flow through the bypass duct in the deployed configuration. The first element may then be able to rotate about the joint into its deployed position across the bypass duct. The first and second elements may not translate relative to each other. Optionally, the first and second elements may translate together relative to the rest of the gas turbine engine under the action of the actuator. Alternatively, the first and second elements may be fixed, and the first part of the nacelle may translate relative to the rest of the gas turbine engine to expose the first and second elements.

The TRU may further comprise a slidable link member that is rotatably fixed to the first element at a first end (for example by a hinge) and translatable relative to the first part of the nacelle so as to translate with the first and second elements relative to the first part of the nacelle under the action of the actuator.

The TRU may also comprise a stop element fixed to the first part of the nacelle, the stop element being arranged to engage the slidable link member at a second end of the slidable link member at a predetermined position of the first element relative to the first part of the nacelle. Accordingly, further translation of the slidable link member, and thus the first element to which it is attached, relative to the first part of the nacelle may be prevented when the slidable link member engages the stop element.

When the stop element and the second end of the slidable link member are engaged, further translation of the second element relative to the first part of the nacelle (for example under the continued action of the actuator) may cause rotation of the slidable link member so as to allow the rotation of the first element relative to the second element into its deployed position across the bypass duct, the slidable link member thereby forming a part of the joint that rotatably attaches the first element to the second element.

Accordingly, a single actuator may be used both to effect translation of the first and second elements into position, and to provide rotation of the first element relative to the second element into its deployed position.

The first part of the nacelle may comprise a rail, for example forming a slot or a passage. The second end of the slidable link member may be arranged to slide along (for example within or on) the rail as the first element slides relative to the first part of the nacelle up to the stop member. The slidable link member may take any suitable form, such as a T-shaped bar that slides within rails and extends to the first element.

The first part of the nacelle may be a fixed part. The nacelle may further comprise a moveable part. The actuator may act to move the first element, the second element and the movable part of the nacelle relative to the fixed part of the nacelle. This may allow the thrust reverser unit (and in particular the first and second elements) to be moved from the stowed configuration to the deployed configuration.

The joint that rotatably attaches the first element to the second element may comprise a hinge that directly rotatably connects the first element to the second element.

The thrust reverser unit may comprise a support beam extending between the first element and the second element. Such a support beam may be rotatably fixed at a first end to one of the first and the second elements and slidably engaged with the other of the first and the second elements. Accordingly, the support beam may rotate relative to the first and second elements as they rotate relative to each other to allow the first element to adopt its deployed position. When the thrust reverser unit is in the deployed configuration, the support beam may extend in a direction that is substantially perpendicular to the body of the first element. Accordingly, the support beam may transmit, in use, aerodynamic load from the first element to the second element. This may be a particularly robust and reliable arrangement.

A thrust reverser unit may extend around a segment of the engine. The engine may comprise more than two thrust reverser units. For example, an engine may comprise sufficient thrust reverser units to extend around substantially all of the circumference of the engine, for example all of the circumference of the bypass duct. The term thrust reverser unit may be used to refer to a single unit that extends around a segment of the engine or around the circumference of the engine, or collectively to multiple units that together extend around the circumference of the engine.

The thrust reverser unit according to the invention may, of course, be provided as a separate unit that is attached to the gas turbine engine during assembly.

BRIEF DESCRIPTION OF THE DRAWINGS

The invention will now be described, by way of example only, with reference to the accompanying Figures, in which.

DETAILED DESCRIPTION OF THE PREFERRED EMBODIMENTS

Figure 1:
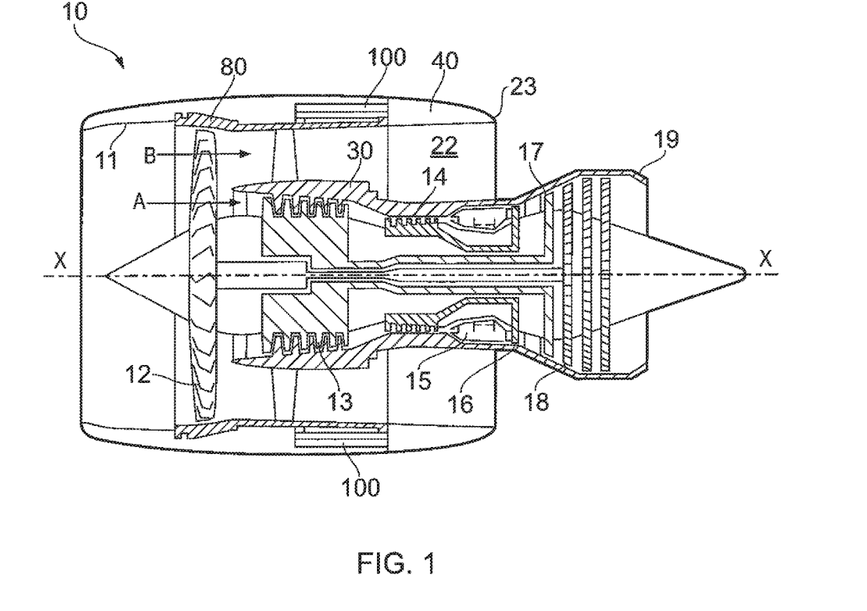
FIG. 1 shows a cross section through a gas turbine engine having a thrust reverser unit in a stowed configuration.

With reference to FIG. 1, a ducted fan gas turbine engine generally indicated at 10 has a principal and rotational axis X-X. The engine 10 comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low pressure turbine 18 and a core engine exhaust nozzle 19. The engine also has a bypass duct 22 and a bypass exhaust nozzle 23. The bypass duct 22 may be a generally annular passage, having a core case 30 at its inner radius, and a nacelle 40 and/or a fan case 80 at its outer radius.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

The gas turbine engine 10 also comprises a thrust reverser unit (TRU). The thrust reverser unit (TRU) 100 may be in accordance with the present invention, as described below in more detail. In FIG. 1, the TRU 100 is shown schematically in the stowed configuration, in which it is contained within the nacelle 40. In this position, the TRU does not influence the flow through the bypass duct 22, which therefore provides forward thrust.

As discussed elsewhere herein, the TRU 100 may also adopt a deployed configuration, in which at least a part of it extends across the bypass duct 22 so as to influence the flow through the bypass duct 22 to provide "reverse thrust", or a decelerating force.

As explained above, FIG. 2 shows a conventional TRU 50 in both the stowed and deployed configurations, and reference is made to the description of the operation and limitations of the conventional TRU 50 provided above.

Figure 3:
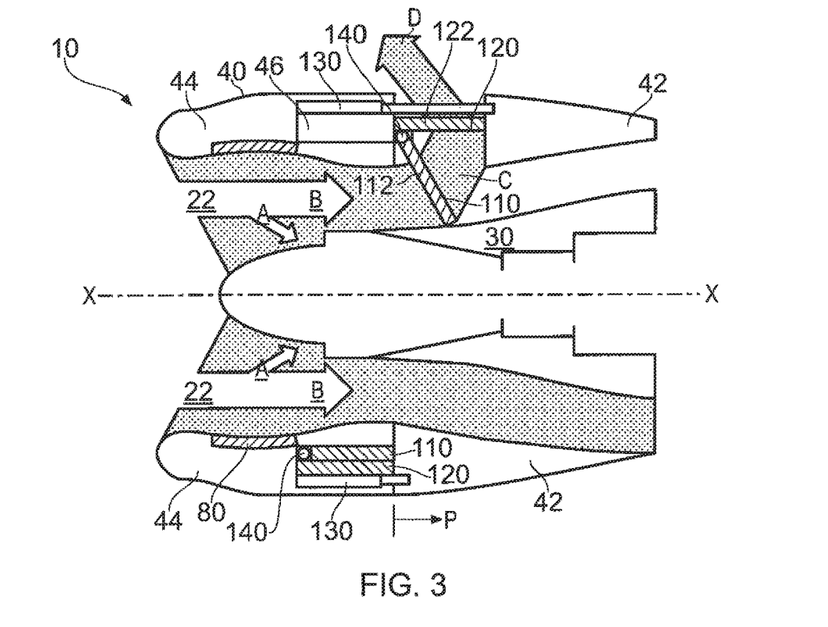
FIG. 3 shows a cross section through a gas turbine engine having a thrust reverser unit according to the invention in both a deployed configuration and a stowed configuration.

FIG. 3 is a corresponding cross sectional schematic of a gas turbine engine 10 having a TRU 100 in accordance with the invention. In FIG. 3, the TRU 100 is shown in both a deployed configuration (shown at the top of FIG. 3), and a stowed configuration (shown at the bottom of FIG. 3). It will be appreciated that, in use, all of the TRU 100 would be either in the deployed configuration or the stowed configuration, and that FIG. 3 shows both the stowed and deployed configurations merely for ease of explanation.

The TRU 100 shown in FIG. 3 comprises a first cascade element 110, a second cascade element 120, a joint 140 that rotatably attaches the first cascade element 110 to the second cascade element 120, and an actuator 130.

In the stowed configuration, the first cascade element 110 and the second cascade element 120 are contained in the nacelle 40. The first and second cascade elements 110, 120 and the joint 140 may be contained in a stationary part 44 of the nacelle 40, as may the actuator 130, as shown in the FIG. 3 example. For example, the first and second cascade elements 110, 120 and the joint 140 may be contained in a recess 46 in a stationary part 44 of the nacelle 40. As such, in the stowed configuration none of the first and second cascade elements 110, 120, the joint 140, and the actuator 130 affects the flow B through the bypass duct. Thus, the TRU 100 does not create any losses in the flow B through the bypass duct 22 when in the stowed configuration.

In the deployed configuration, the first cascade 110 extends across the bypass duct 22. For example, as shown in the FIG. 3 example, the first cascade element 110 may rotate relative to the second cascade element 120 (and indeed relative to the rest of the engine 10) about the joint 140 so as to extend across the bypass duct from the nacelle 40 to the core case 30, such that it contacts the core case 30 at its radially innermost extent. In this case, loads may (or may not) be transmitted from the first cascade element 110 to the core case 30. Alternatively, the first cascade element 110 may only extend partially across the bypass duct 22 in the deployed configuration. The second cascade element 120 may not rotate relative to the rest of the engine (for example relative to the nacelle 40), again as shown in the FIG. 3 example.

The first cascade element 110 may be said to rotate forwards, i.e. towards the flow B through the bypass duct 22. The first cascade element 22 may be said to rotate about an axis that extends in an approximately circumferential direction of the engine 10, although the actual axis of rotation may be a straight line and thus may vary relative to the circumferential direction along its length. The extent of the rotation may be different between applications, for example between engines, and may be in the ranges described elsewhere herein.

In addition to the rotation of the first cascade element 110, both the first and second cascade elements 110, 120, and the joint 140 between them, may translate between the stowed and deployed configurations in a direction that is generally parallel to the longitudinal axis X-X of the engine 10. The translation may be said to be in a rearward direction p in the FIG. 3 example, i.e. in the downstream direction of the flow B through the bypass duct. The translation may be said to be relative to a fixed part 44 of the nacelle 40. A moveable part 42 of the nacelle 40 may translate with the first and second cascade elements 110, 120, thereby exposing the second cascade element 120 to the flow in the bypass duct 22. The translation may be caused by operation of the actuator 130, which may extend in a direction generally aligned with the rotational axis X-X of the engine 10.

In the deployed configuration shown at the top of FIG. 3, the flow B entering the bypass duct 22 passes through the first cascade element 110. The first cascade element 110 turns the flow away from the downstream axial direction as it passes through. In other words, the downstream axial momentum of the flow is reduced as it passes through the first cascade element 110. In this way, the flow is turned by the first cascade element 110 towards the second cascade element 120. The momentum of the flow in the radially outer direction may be increased as it passes through the first cascade element 110. Unlike the TRU 50 described in relation to FIG. 2, a TRU 100 according to the invention does not require a blocker door, with its associated flow inefficiency.

The flow subsequently passes through the second cascade element 120. The second cascade element 120 turns the flow further away from the downstream axial direction as it pass through. Indeed, the second cascade element 120 may turn the flow to the extent that it has an upstream axial flow component at its exit, as shown in the FIG. 3 example, thereby generating decelerating thrust. The downstream axial momentum of the flow is reduced as it passes through the second cascade element 120.

Figure 4:
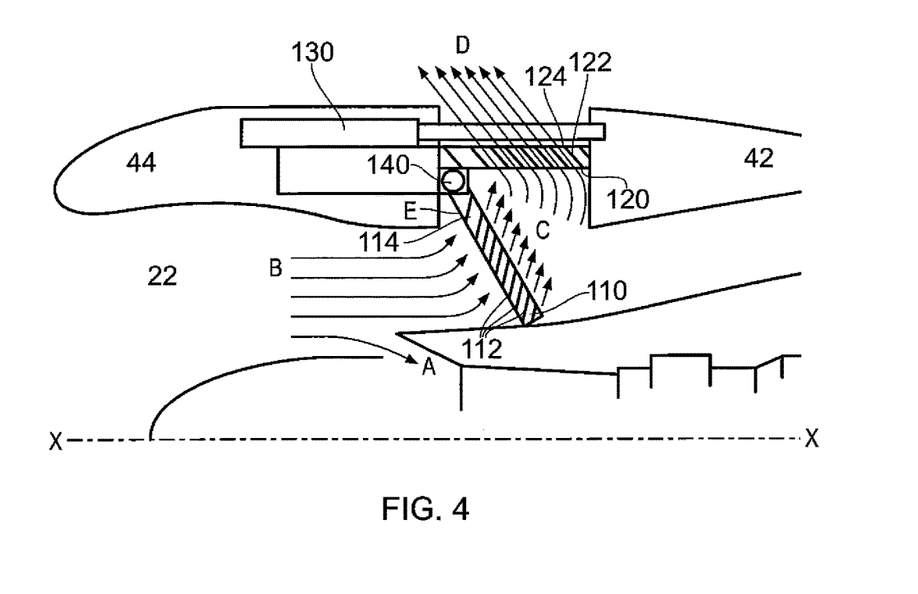
FIG. 4 is a schematic showing an example of the flow through a part of a gas turbine engine with a thrust reverser according to the present invention in the deployed configuration.

The flow through the TRU 100 in the deployed configuration is shown in more detail in FIG. 4. Note that in FIG. 4, the fan 12 is not shown for simplicity. The arrows in FIG. 4 are schematics of the streamlines through the deployed TRU 100 during operation. The flow B in the bypass duct 22 is turned by the first cascade element 110, through flow passages 112 therein. Each of the flow passages may have substantially the same direction as each other at inlet, as shown in the FIG. 4 example. In this way, the flow at inlet to the first cascade element 110 may be substantially homogeneous, for example in the same direction, across the bypass duct 22. Similarly, each of the flow passages may have substantially the same direction as each other at outlet, also as shown in the FIG. 4 example. In this way, the flow at outlet of the first cascade element 110 may be substantially homogeneous, for example in the same direction. This may help to ensure that the flow into the second cascade element 120 is homogeneous, for example at the same inlet angle to the second cascade element. 120. This means that the second cascade element 120 can efficiently turn the inlet flow C to the exit flow D. For example, the flow passages 122 in the second cascade element 120 may all have the same inlet angle and/or may all have the same outlet angle, resulting in a cascade element 120 that is both straightforward to manufacture and turns all of the flow across its length efficiently. Alternatively, however, some flow passages 112, 122 in one or both of the first and second cascade elements 110, 120 may have different inlet and/or outlet flow angle to other flow passages 112, 122 in that cascade element 110, 120, for example to best match the flow regime across the bypass duct 22.

Furthermore, because of the proximity of the first cascade element 110 to the outer wall of the bypass duct (which may be formed by the fixed nacelle portion 44, and/or may be referred to as the fan ramp) at its outer radius, the flow does not tend to separate from the outer wall of the bypass duct 22 in this region, which is indicated as region E in FIG. 4. This may be because the proximity of the first cascade element 110 to the outer wall of the bypass duct influences the local adverse pressure gradient in that region, reducing the likelihood of separation. This enables flow turning to occur across substantially the full extent of the first cascade element 110, from the inner to outer radius.

The reduced flow separation in the region E around the outer wall of the bypass duct and the homogenous flow turning across the first cascade element 110 both mean that the upper cascade element can itself turn the flow more efficiently. This means that a smaller, lighter and/or more compact second cascade element 120, and thus TRU 100, can be used for a given flow turning or decelerating thrust.

As described above, in order to allow the flow to pass through the first and second cascade elements 110, 120, they each have respective flow passages 112, 122 in the embodiment of FIGS. 3 and 4. In the FIGS. 3 and 4 embodiment, these flow passages 112, 122 are shown as being defined between respective walls 114, 124. The walls 114, 124 may take any suitable form or shape. For example, the walls 114, 124 could be simple flat surfaces with the same flow angle at inlet and outlet, or they may be curved surfaces with different flow angle at inlet and outlet to assist flow turning, or they may be aerofoil shapes which may have the same or different flow angles at inlet and outlet. Aerofoil shaped walls may provide particularly efficient flow turning, whereas curved or flat surfaces may be more straightforward to manufacture.

One or both of the first and second cascade elements 110, 120 may be provided with at least one longitudinally extending vane or strut, i.e. an elongate element extending in the lengthwise direction of the element 110, 120, which may approximately correspond to the axial direction X-X of the engine when the elements 110, 120 are in the stowed configuration. Such struts (which are not shown in the Figures, but may or may not be included in any embodiment) may increase the strength and/or stiffness of the elements 110, 120, and/or may have an aerodynamic function, for example to direct or guide the flow in a direction having a component that is angled to (for example substantially perpendicular to) the flow guiding provided by the walls 114, 124. Additionally or alternatively, the longitudinally extending struts, where present, may split the respective cascade element 110, 120 into two or more segments. The flow passages 112, 122 in one segment may have a different shape, for example different inlet and/or outlet angles, to the flow passages in another segment, and/or may run perpendicularly to or diagonally between the struts. This may be convenient if it necessary to direct the flow differently around the circumference of the engine, for example if it is decided that the flow is not to be directed onto certain components, such as the wing, fuselage or ground.

The operation of an example of a TRU 100 according to the present invention will now be described with reference to FIGS. 5 to 10. Note that movement of the TRU 100 from the deployed configuration to the stowed configuration may be substantially the opposite to the movement of the TRU 100 from the stowed configuration to the deployed configuration described herein.

Figure 5:
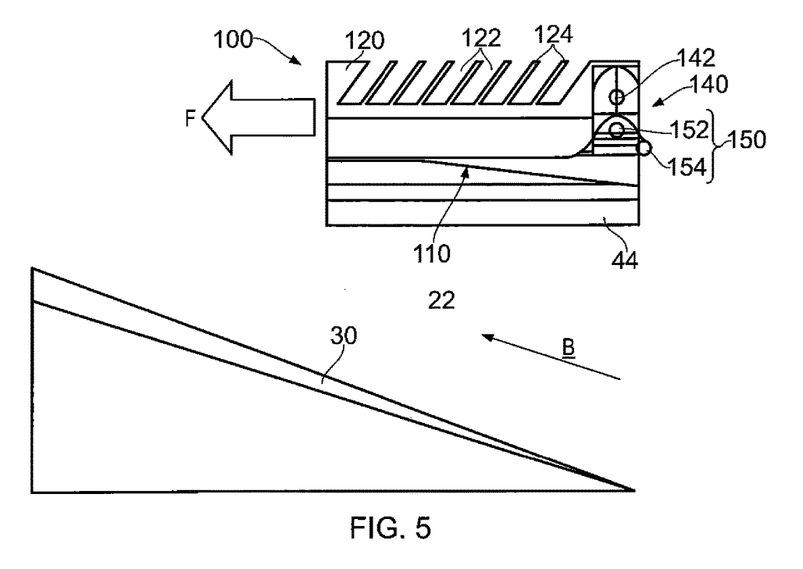
FIG. 5 is a schematic side view of a TRU according to the present invention in the stowed configuration.
Figure 6:
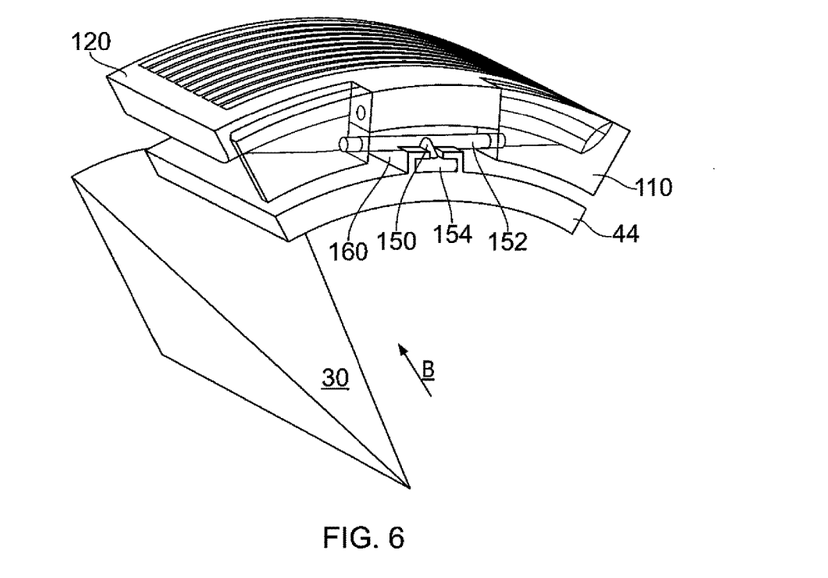
FIG. 6 is a schematic perspective view of the TRU shown in FIG. 5 in the stowed configuration.

FIGS. 5 and 6 show the TRU 100 in the stowed configuration. In the example of FIGS. 5 and 6, the first cascade element 110 is at least partly nested within the second cascade element in the stowed configuration. This may allow for particularly compact storage of the TRU 100, but may not be present in all examples of the invention.

The first and second cascade elements 110, 120 may be directly connected to each other by a hinge 142, as in the example shown in FIGS. 5 to 10. Such a hinge 142 allows rotation of the first element 110 relative to the second element 120, and may thus be referred to as a hinge 142 that directly rotatably connects the first element 110 to the second element 120.

The hinge 142 in the example of FIGS. 5 to 10 is part of the joint 140 that rotatably attaches the first element 110 to the second element 120. The TRU 100 also comprises a slidable link member 150, the operation of which is described in greater detail elsewhere herein. The slidable link member 150 has a first end 152 and a second end 154. In the example of FIGS. 5 to 10, the first end 152 is directly rotatably connected to the first element 110, thereby allowing rotation of the slidable link member 150 relative to the first element 110, as described in more detail below. The second end 154 is slidable and rotatable within a rail 160, thereby allowing the slidable link member 150 to both slide (or translate) and rotate relative to the rail 160, as described in more detail below. The slidable link member 150 may be considered to be part of the joint 140 that rotatably attaches the first element 110 to the second element 120.

The TRU 100, including the first and second elements 110, 120, the slidable link member 150, the joint 140 and the rail 160, is contained within the engine, outside of the bypass duct 22 in the stowed configuration. In the example shown in FIGS. 5 and 6, the TRU 100 is contained within the nacelle 40, in particular within a fixed part 44 of the nacelle 40.

In the example of FIGS. 5 to 10, the rail 160 is provided on the nacelle 44, but it will be appreciated that the rail 160 may be provided on fixed structure of the engine, such as the fan case 80 or a front mount that is used to fix the engine 10 to an aircraft. Indeed, the rail 160 may take any suitable form that allows the slidable link member 150 to both translate and rotate relative to a fixed structure of the engine 10, for example under the action of an actuator 130 (which is not shown in FIGS. 5 to 10, but may be as described by way of example in relation to FIGS. 3 and 4).

Figure 8:
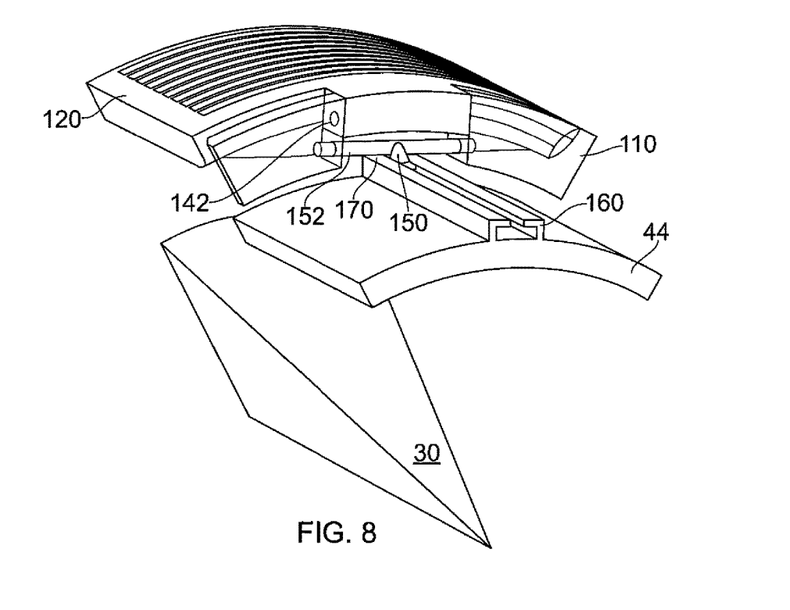
FIG. 8 is a schematic perspective view of the TRU shown in FIG. 7 in an intermediate position between the stowed and deployed configurations.
Figure 9:
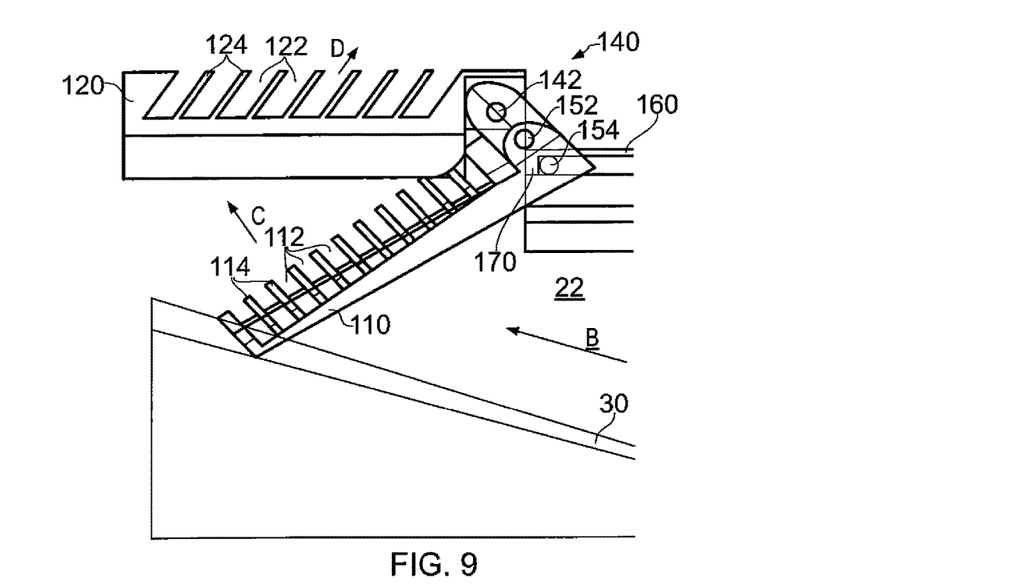
FIG. 9 is a schematic side view of a TRU according to the present invention in the in the deployed configuration.
Figure 10:
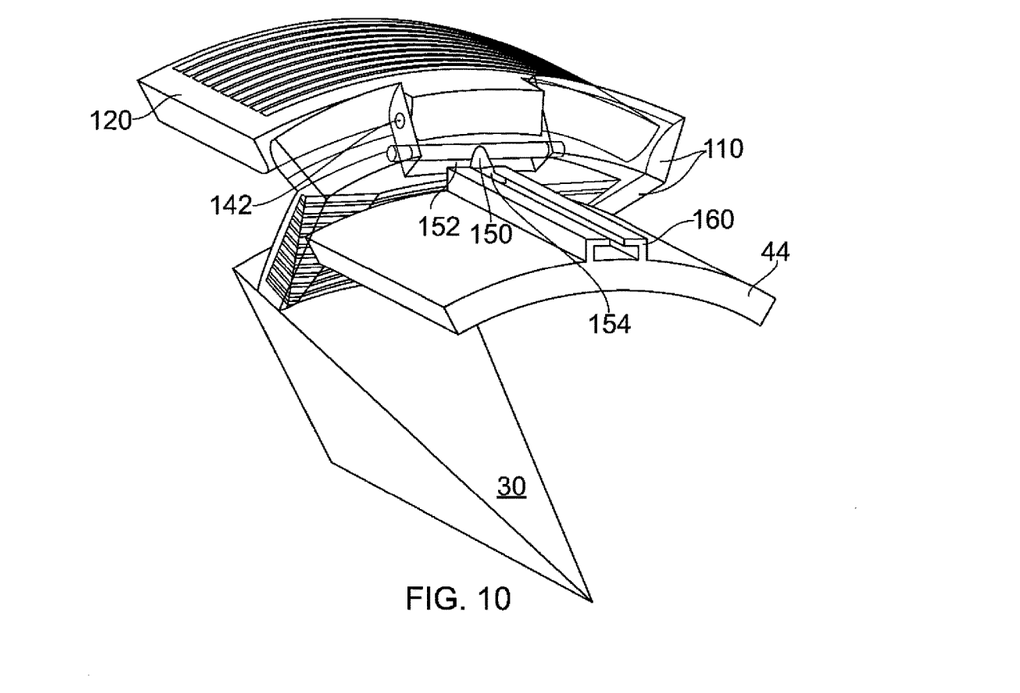
FIG. 10 is a schematic perspective view of the TRU shown in FIG. 9 in the deployed configuration.

In order to move the TRU 100 from the stowed configuration shown in FIGS. 5 and 6 to the deployed configuration shown in FIGS. 9 and 10, a force F is provided, for example by an actuator 130. The force F may be provided in a direction that is substantially parallel to the longitudinal axis (or rotation axis or centreline) X-X of the engine 10, as in the example of FIGS. 5 to 10.

Initially, the first and second cascade elements 110, 120, together with the joint 140 between them, translate under the action of the force F. During this translation, the slidable link member 150 slides, or translates, in the rail 160. The force F may be provided to any part of the assembly that translates with the first and second cascade elements 110, 120. For example, the force F may be provided to one or both of the cascade elements 110, 120 themselves, or to a moveable part 42 of the nacelle 40 that may be connected to the second (or upper) cascade element 120. Such a moveable part 42 of the nacelle 40 is shown in FIGS. 3 and 4, but is omitted from FIGS. 5 to 10 purely for simplicity.

Figure 7:
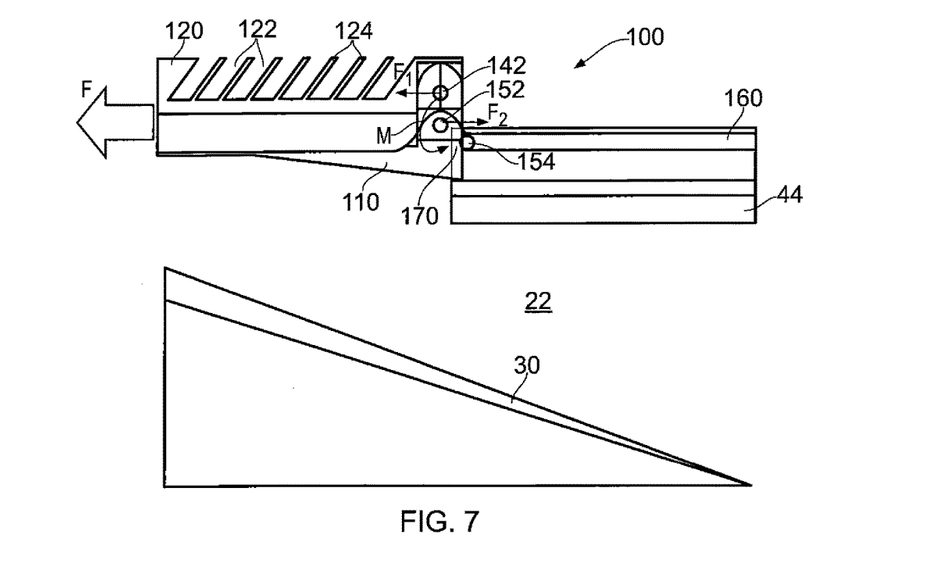
FIG. 7 is a schematic side view of a TRU according to the present invention in the in an intermediate position between the stowed and deployed configurations.

The first and second cascade elements 110, 120 may slide together until the second end 154 of the slidable link member 150 contacts the stop element 170, for example to the position shown in FIGS. 7 and 8. The stop element may take any form that prevents further translation of the slidable link member 150. The first and second cascade elements may translate together for approximately the length of the second cascade element 120 (which itself may be approximately the same as the length of the first cascade element 110), for example.

Further application of the force F after the slidable link member 150 is blocked from further translation by the stop element 170 results in a moment M being exerted on the first cascade element 110. This moment may be generated by a force $F_1$ acting through the second cascade element 120 onto the first cascade element 110 via the hinge 142, and an offset opposing force $F_2$ acting on the first cascade element 110 via the first end 152 of the slidable link member 150.

The moment M acting on the first cascade element 110 in the example of FIGS. 5 to 10 causes it to rotate radially inwards into the bypass duct 22, as shown in FIGS. 9 and 10. In the example of FIGS. 5 to 10, this rotation may be accompanied by further slight translation of the second cascade element 120. In such an arrangement, the further translation of the second cascade element 120 and the rotation of the first cascade element 110 may be coordinated such that when the further translation reaches its maximum extent, the first cascade element 110 is at its desired position. The desired position of the first cascade element may be entirely across the bypass duct 22 so as to rest on the radially inner surface 30 (or core case 30) of the bypass duct 22, as in the example shown in FIGS. 9 and 10. In arrangements where the first cascade element extends entirely across the bypass duct 22 so as to rest on the radially inner surface 30 of the bypass duct 22, it may nevertheless transfer substantially no load to the inner surface 30 of the bypass duct 22.

In the deployed position shown in FIGS. 9 and 10, the flow B in the bypass duct is firstly turned by the first cascade element 110 towards the second cascade element 120, as indicated by the arrow C in FIG. 9. The flow C is then further turned away from the flow B in the bypass duct as it passes through the second cascade element 120. As shown in FIG. 9 (and also in FIG. 4), once the flow D has passed through the second cascade element 120, it may have a component in the forward direction, i.e. towards the front of the engine, which is an upstream direction relative to the flow into the engine, thereby providing a decelerating thrust.

FIGS. 11 to 14 show the operation of another example of a TRU 100 according to the invention. The operation of the TRU 100 shown in FIGS. 11 to 14 is substantially the same as that described above in relation to FIGS. 5 to 10, and like features have the same reference numerals.

In addition to the features common to the example shown in FIGS. 5 to 10, the TRU 100 shown in FIGS. 11 to 14 also comprises a support beam 180 extending between the first element 110 and the second element 120. The support beam 180 has a first end 182 that is rotatably attached to the second cascade element 120, i.e. it is fixed to the second cascade element 120 at its first end 182, and rotatable relative to the second cascade element 120 about its first end 182. The support beam 180 of the TRU 100 shown in FIGS. 11 to 14 is slidably engaged at a second end 184 with the first cascade element 110. In the example of FIGS. 11 to 14, the second end 184 of the support beam 180 engages with a slot 190 in the first cascade element 110, and is slidable within that slot 190. Of course, where a support beam 180 is provided, other arrangements may be used, such as arrangements in which the slot 190 is provided on the second cascade element 120 in addition to or as an alternative to the slot 190 on the first cascade element 110.

Figure 11:
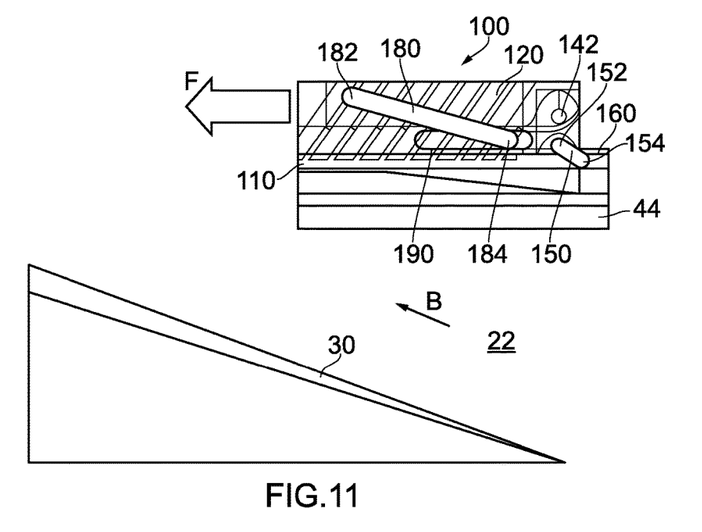
FIG. 11 is a schematic side view of a TRU according to the present invention in the stowed configuration.
Figure 12:
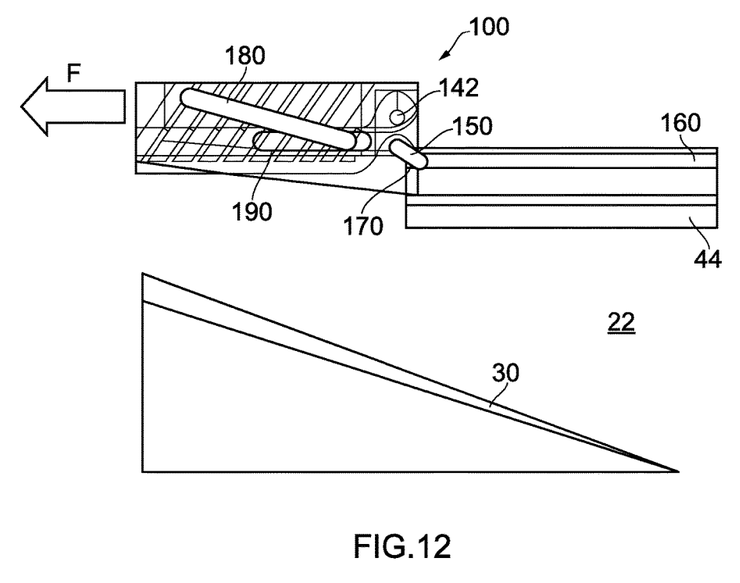
FIG. 12 is a schematic side view of the TRU of FIG. 11 in an intermediate position between the stowed and deployed configurations.

As with the example described in relation to FIGS. 5 to 10, the first and second cascade elements 110, 120 initially translate from the stowed position shown in FIG. 11 to an intermediate position shown in FIG. 12 under the action of a force F, which may be provided by an actuator 130. The support beam 180 translates with the first and second cascade elements 110, 120. Again, in the intermediate position shown in FIG. 12, further translation of the slidable link member 150 is prevented by engagement with a stopper 170. Thus, further application of the force F generates a moment M on the first cascade element 110, causing it to rotate into the bypass duct 22, as described in relation to the example of FIGS. 5 to 10.

Figure 13:
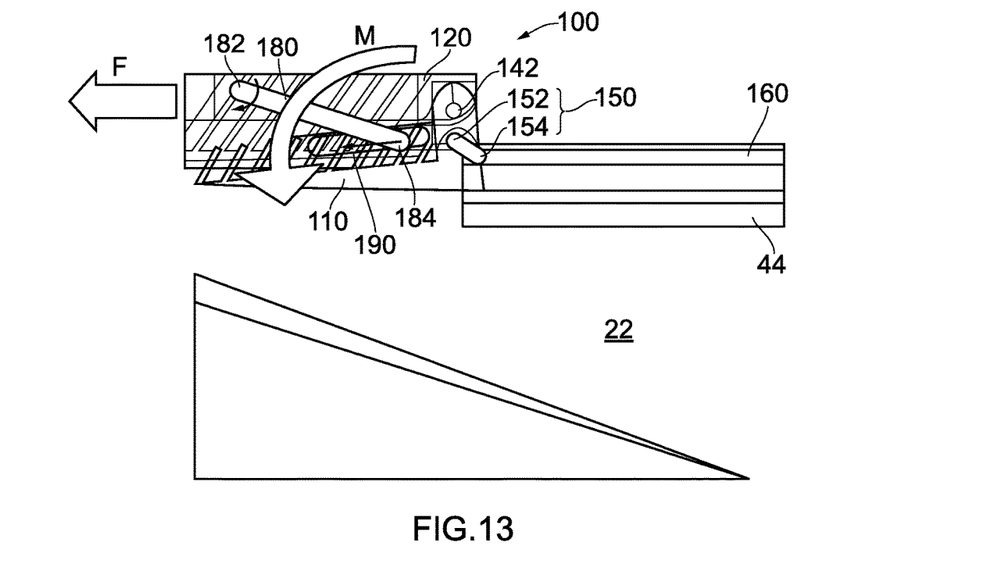
FIG. 13 is a schematic side view of the TRU of FIGS. 11 and 12 in an intermediate position between the stowed and deployed configurations.

In the example shown in FIG. 13, as the first cascade element 110 rotates relative to the second cascade element 120, the support beam 180 also rotates, about its first end 182, as indicated by the arrow q in FIG. 13. The rotation of the support beam 180 may be in the opposite sense to the rotation of the first cascade element 110, as shown in FIG. 13. In order to accommodate this rotation of the support beam 180 about its first end 182, the second end 184 of the support beam 180 slides in the direction indicated by arrow r in FIG. 13 along the slot 190 in the first cascade element 110.

Figure 14:
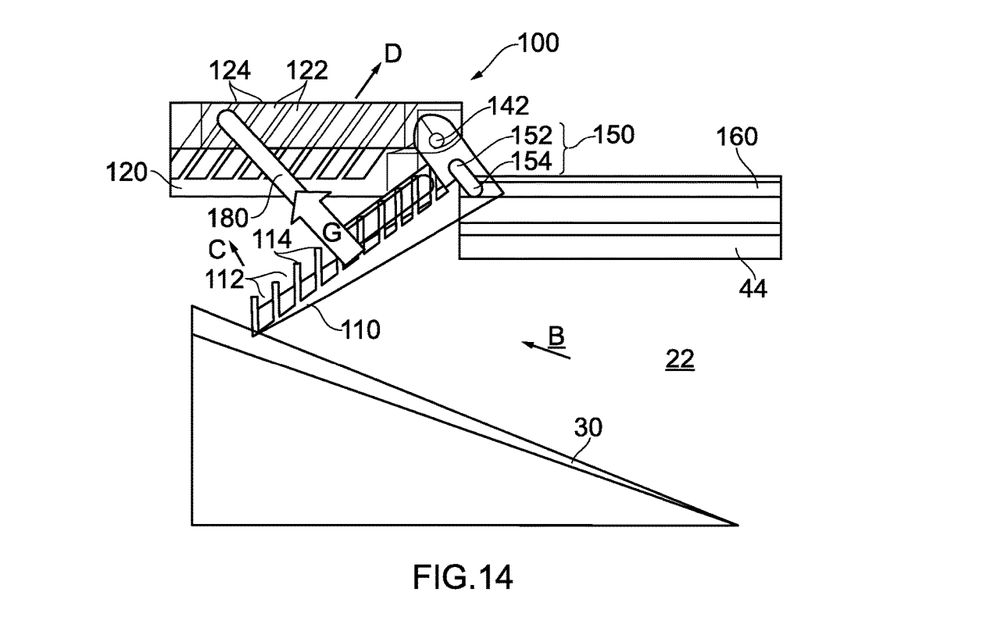
FIG. 14 is a schematic side view of the TRU of FIGS. 11 to 13 in the deployed configuration.

When the TRU 100 is in the deployed configuration, and the first cascade element 110 is in its deployed position, as shown in FIG. 14, the support beam 180 provides a load path between the first cascade element 110 and the second cascade element 120. Thus, aerodynamic loading G on the first cascade element 110 when in the deployed position may be reacted to the rest of the engine 10 through the second cascade element 120 via the support beam 180. In order to transmit load G from the first cascade element 110 to the second cascade element 120, the support beam 180 may be substantially perpendicular to the first cascade element 110 when in the deployed position, as shown in FIG. 14. Thus, inclusion of the support beam 180 may provide a particularly structurally robust arrangement in the deployed configuration, which may be particularly advantageous when the throttle is opened with the TRU 100 in the deployed configuration in order to provide greater decelerating reverse thrust.

Figure 15:
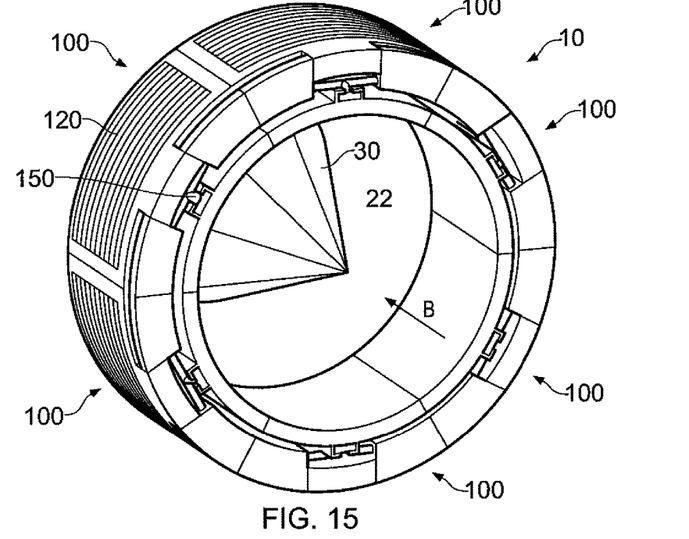
FIG. 15 is a schematic perspective view of a part of a gas turbine engine having TRUs according to the present invention in the stowed configuration.
Figure 16:
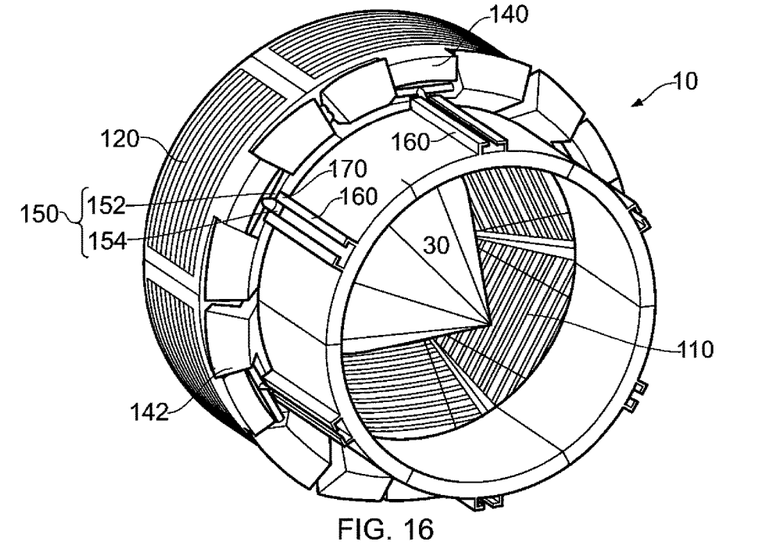
FIG. 16 is a schematic perspective view of the part of the gas turbine engine shown in FIG. 15, with the TRUs in the deployed configuration.

FIGS. 15 and 16 show a schematic of a part of a gas turbine engine 10 having multiple TRUs 100 according to the present invention. Each TRU 100 may be a segment of an complete thrust reverser unit, and as such may be referred to as thrust reverser unit segments 100. The TRUs 100 may be any TRU within the scope of the invention, such as those described by way of example herein, for example in relation to FIGS. 3 to 14. The TRUs 100 may be arranged around the circumference of a gas turbine engine 10, as with the example shown in FIGS. 15 and 16. In FIGS. 15 and 16, the gas turbine engine 10 is provided with six TRUs 100 around its circumference, so as to entirely surround the bypass duct 22. However, it will be appreciated that any number of TRUs 100 may be provided around the circumference of the engine 10 depending on, for example, the angle of the arc covered by each individual TRU 100.

FIG. 15 shows the TRUs 100 in the stowed configuration, and FIG. 16 shows the TRUs 100 in the deployed configuration. The operation of the TRUs 100 may be as described above, for example in relation to FIGS. 3 to 14. Accordingly, the features of FIGS. 15 and 16 that relate to those of FIGS. 3 to 14 are given the same reference numerals, and will not be described in detail again in relation to FIGS. 15 and 16. Note that the actuator 130 is not shown in FIGS. 15 and 16 for simplicity. However, each TRU 100 may be provided with its own actuator 130, or a single actuator 130 may operate more than one TRU 100, for example all of the TRUs 100.

FIG. 15 clearly illustrates that, in the stowed configuration, none of the TRU 100 is exposed to the flow in the bypass duct and thus in normal flight conditions the TRU 100 has no detrimental impact on the aerodynamic performance of the engine. FIG. 16 shows that, in the deployed configuration, the first cascade elements 110 extend across the bypass duct 22 so as to guide (or re-direct) the flow towards the second cascade element 120, thereby effectively blocking and redirecting the bypass flow 22. As described above, the second cascade element 120 then further redirects the flow to provide efficient decelerating reverse thrust.

Where reference is made herein to a gas turbine engine, it will be appreciated that this term may include a gas turbine engine/gas turbine engine installation and optionally any peripheral components to which the gas turbine engine may be connected to or interact with and/or any connections/ interfaces with surrounding components, which may include, for example, an airframe and/or components thereof. Such connections with an airframe, which are encompassed by the term 'gas turbine engine' as used herein, include, but are not limited to, pylons and mountings and their respective connections. The gas turbine engine itself may be any type of gas turbine engine, including a turbofan (bypass) gas turbine engine.

It will be appreciated that many alternative configurations and/or arrangements of TRUs 100 and gas turbine engines 10 comprising TRUs 100 other than those described herein may fall within the scope of the invention. For example, alternative arrangements of TRUs 100 (for example in terms of the operation and construction of the joint 140 about which the first cascade element 110 rotates relative to the second cascade element 120, and the arrangement and construction of the first and/or second cascade elements 110, 120) may fall within the scope of the invention and may be readily apparent to the skilled person from the disclosure provided herein. By way of further example, a TRU 100 may additionally comprise a blocker door that, in the deployed configuration, is downstream of the first cascade element 110 and extends at least partially across the bypass duct 22 so as to prevent or reduce flow passing through the bypass duct 22, if required. Such a blocker door may also be stored in the nacelle in the stowed configuration. However, such a blocker door may not be provided in many examples of the invention, such as those described herein. Any feature described and/or claimed herein may be combined with any other compatible feature disclosed in relation to the same or another claim and/or embodiment.

I claim:

1. A gas turbine engine having a bypass duct and a thrust reverser unit, the bypass duct being defined at an outer radius by a nacelle and the thrust reverser unit being operable in either a stowed configuration or a deployed configuration, the thrust reverser unit comprising:
   a first element having a plurality of flow passages through which gas passes;
   a second element having a plurality of flow passages through which gas passes;
   a joint that rotatably attaches the first element to the second element, the first element and the second element being configured such that:
   in the stowed configuration, the first element and the second element are contained within the nacelle;
   between the stowed configuration and the deployed configuration, the first element is arranged to rotate about the joint relative to the second element; and
   in the deployed configuration, the first element extends across the bypass duct, and a flowpath is formed between the first element and the second element through which at least some of the flow through the bypass duct flows through the first element and subsequently through the second element; and
   an actuator arranged to deploy the thrust reverser unit from the stowed configuration to the deployed configuration in a two-stage process, the two-stage process including: (i) only linearly translating both the first element and the second element from within the nacelle to exposed to an outside of the nacelle, and (ii) subsequently rotating the first element about the joint into a deployed position across the bypass duct forming the flowpath.

2. The gas turbine engine according to claim 1, wherein:
   in the stowed configuration, the first element and the second element are substantially parallel; and
   in the deployed configuration, the second element forms an angle with the first element in a range of 10 degrees to 90 degrees.

3. The gas turbine engine according to claim 1, wherein:
   the gas turbine engine has a longitudinal axis; and
   an angle of the second element relative to the longitudinal axis is the same in both the stowed configuration and the deployed configuration.

4. The gas turbine engine according to claim 1, wherein the joint that rotatably attaches the first element to the second element is positioned at an upstream end of the first element and the second element with respect to airflow through the bypass duct in use.

5. The gas turbine engine according to claim 1, wherein:
   the plurality of flow passages in the first element are defined by a plurality of flow turning vanes; and
   the plurality of flow turning vanes of the first element are arranged so as to turn the flow towards the second element when in the deployed configuration.

6. The gas turbine engine according to claim 1, wherein:
the plurality of flow passages in the second element are defined by a plurality of flow turning vanes; and
the plurality of flow turning vanes of the second element are arranged so as to turn the flow towards an upstream direction with respect to airflow through the bypass duct in use.

7. The gas turbine engine according to claim 1, wherein:
the plurality of flow passages in both the first element and the second element are defined by a plurality of flow turning vanes; and
the plurality of flow turning vanes of the first element and the second element turn the flow about a circumferential direction of the engine.

8. The gas turbine engine according to claim 7, wherein, in the stowed configuration, the plurality of flow turning vanes of the first element are nested within the plurality of flow turning vanes of the second element.

9. The gas turbine engine according to claim 1, wherein the actuator is arranged to translate the first element and the second element relative to a first part of the nacelle so as to expose the first element and the second element to the flow through the bypass duct in the deployed configuration.

10. The gas turbine engine according to claim 9, further comprising:
a slidable link member rotatably fixed to the first element at a first end and translatable relative to the first part of the nacelle, so as to translate with the first element and the second element relative to the first part of the nacelle under the action of the actuator; and
a stop element fixed to the first part of the nacelle, the stop element being arranged to engage a second end of the slidable link member at a predetermined position of the first element relative to the first part of the nacelle so as to limit further translation of the first element relative to the first part of the nacelle, wherein
when the stop element and the second end of the slidable link member are engaged, further translation of the second element relative to the first part of the nacelle causes rotation of the slidable link member to allow the rotation of the first element relative to the second element into its deployed position across the bypass duct, the slidable link member thereby forming a part of the joint that rotatably attaches the first element to the second element.

11. The gas turbine engine according to claim 10, wherein:
the first part of the nacelle includes a rail; and
the second end of the slidable link member slides along the rail as the first element slides relative to the first part of the nacelle up to the stop element.

12. The gas turbine engine according to claim 9, wherein:
the first part of the nacelle is a fixed part and the nacelle further includes a moveable part; and
the actuator moves the first element, the second element, and the movable part of the nacelle relative to the fixed part of the nacelle to move the thrust reverser unit from the stowed configuration to the deployed configuration.

13. The gas turbine engine according to claim 1, wherein the joint that rotatably attaches the first element to the second element includes a hinge that directly rotatably connects the first element to the second element.

14. The gas turbine engine according to claim 1, further comprising a support beam extending between the first element and the second element, the support beam being: (i) rotatably fixed at a first end to one of the first element and the second element, and (ii) slidably engaged with the other of the first element and the second element, wherein
the support beam rotates relative to the first element and the second element as the first element and the second element rotate relative to each other, allowing the first element to adopt its deployed position; and
in the deployed configuration, the support beam extends in a direction that is substantially perpendicular to a body of the first element to transmit, in use, aerodynamic load from the first element to the second element.

15. The gas turbine engine according to claim 1, further comprising more than two thrust reverser units, wherein each thrust reverser unit extends around a segment of the gas turbine engine.

16. The gas turbine engine according to claim 1, wherein, in the two-stage process, the linear translating of the first element and the second element excludes rotation of the first element and the second element.

17. A method of providing reverse thrust from a gas turbine engine, the gas turbine engine having a thrust reverser unit and a bypass duct defined at an outer radius by a nacelle, the method comprising:
moving the thrust reverser unit from a stowed configuration within the nacelle to a deployed configuration by rotating a first element of the thrust reverser unit, relative to a second element of the thrust reverser unit, from a stowed position within the nacelle to a deployed position in which the thrust reverser unit extends across the bypass duct; and
arranging an actuator to deploy the thrust reverser unit from the stowed configuration to the deployed configuration in a two-stage process, the two-stage process including: (i) only linearly translating both the first element and the second element from within the nacelle to exposed to an outside of the nacelle, and (ii) subsequently rotating the first element about a joint that rotatably attaches the first element to the second element into the deployed position across the bypass duct forming a flowpath, wherein
the first element and the second element both have a plurality of flow passages through which gas passes, such that, in the deployed configuration in use, the flowpath is formed between the first element and the second element through which a portion of a flow through the bypass duct flows through the first element and subsequently through the second element.

* * * * *